(12) United States Patent
Matsudo et al.

(10) Patent No.: US 9,899,651 B2
(45) Date of Patent: Feb. 20, 2018

(54) POWER STORAGE DEVICE HAVING A PRESSURE RELEASE VALVE

(71) Applicant: KABUSHIKI KAISHA TOYOTA JIDOSHOKKI, Kariya-shi, Aichi-ken (JP)

(72) Inventors: Akihisa Matsudo, Kariya (JP); Motoaki Okuda, Kariya (JP); Masami Tomioka, Kariya (JP); Hiroyasu Nishihara, Kariya (JP); Mikiya Kurita, Kariya (JP)

(73) Assignee: KABUSHIKI KAISHA TOYOTA JIDOSHOKKI, Kariya-Shi (JP)

( * ) Notice: Subject to any disclaimer, the term of this patent is extended or adjusted under 35 U.S.C. 154(b) by 324 days.

(21) Appl. No.: 14/438,047

(22) PCT Filed: Nov. 5, 2013

(86) PCT No.: PCT/JP2013/079855
§ 371 (c)(1),
(2) Date: Apr. 23, 2015

(87) PCT Pub. No.: WO2014/073518
PCT Pub. Date: May 15, 2014

(65) Prior Publication Data
US 2015/0280191 A1    Oct. 1, 2015

(30) Foreign Application Priority Data

Nov. 6, 2012  (JP) .................................. 2012-244677
May 1, 2013   (JP) .................................. 2013-096398

(51) Int. Cl.
*H01M 2/12*    (2006.01)
*H01M 2/02*    (2006.01)

(52) U.S. Cl.
CPC .......... *H01M 2/1241* (2013.01); *H01M 2/024* (2013.01); *H01M 2220/20* (2013.01)

(58) Field of Classification Search
None
See application file for complete search history.

(56) References Cited

U.S. PATENT DOCUMENTS

2005/0181272 A1    8/2005  Kim
2011/0212350 A1*   9/2011  Sato .................... H01M 2/0404
                                                        429/56

(Continued)

FOREIGN PATENT DOCUMENTS

JP    09-320549 A    12/1997
JP    2002-025525 A   1/2002

(Continued)

OTHER PUBLICATIONS

International Preliminary Report on Patentability dated May 12, 2015 from the International Bureau in counterpart International Application No. PCT/JP2013/079855.

(Continued)

*Primary Examiner* — Lucas J. O'Donnell
(74) *Attorney, Agent, or Firm* — Sughrue Mion, PLLC

(57) ABSTRACT

A power storage device includes a case and a pressure release valve. The pressure release valve includes arcuate portions, intersecting grooves, and arcuate grooves that are connected to the ends of the intersecting grooves and extend along the arcuate portions. When imaginary straight lines extend along the intersecting grooves and intersect the circumferential edge of the pressure release valve, a first region, which is surrounded by the imaginary straight lines and the circumferential edge of the pressure release valve, and a second region, which is surrounded by the imaginary straight lines and the circumferential edge of the pressure release valve, are defined. The part of the first region that is (Continued)

in contact with the arcuate portions is larger than the part of the second region that is in contact with the arcuate portions. The area of the first region is greater than the area of the second region.

13 Claims, 8 Drawing Sheets

(56) References Cited

U.S. PATENT DOCUMENTS

| | | | |
|---|---|---|---|
| 2011/0236734 A1 | 9/2011 | Ikeda | |
| 2011/0305946 A1* | 12/2011 | Moride | H01M 2/043 429/185 |
| 2016/0293917 A1* | 10/2016 | Matsudo | H01M 2/1241 |

FOREIGN PATENT DOCUMENTS

| | | |
|---|---|---|
| JP | 2005-129524 A | 5/2005 |
| JP | 2010-165590 A | 7/2010 |
| JP | 2011-181214 A | 9/2011 |
| JP | 2011-210485 A | 10/2011 |
| JP | 2012-059496 A | 3/2012 |
| WO | 2010/100731 A1 | 9/2010 |

OTHER PUBLICATIONS

International Search Report for PCT/JP2013/079855 dated Dec. 10, 2013 [PCT/ISA/210].

* cited by examiner

POWER STORAGE DEVICE HAVING A PRESSURE RELEASE VALVE

CROSS REFERENCE TO RELATED APPLICATIONS

This application is a National Stage of International Application No. PCT/JP2013/079855 filed Nov. 5, 2013, claiming priorities based on Japanese Patent Application Nos. 2012-244677 filed Nov. 6, 2012 and 2013-096398 filed May 1, 2013, the contents of all of which are incorporated herein by reference in their entirety.

FIELD OF THE INVENTION

The present invention relates to a power storage device that includes a pressure release valve, which releases the pressure in the case to the outside of the case.

BACKGROUND OF THE INVENTION

A vehicle such as an electric vehicle (EV) and a plug-in hybrid vehicle (PHV) is equipped with a rechargeable battery as a power storage device that stores a power supply to a motor for running the vehicle. Patent Document 1 discloses such a rechargeable battery, for example. The rechargeable battery has negative electrodes configured by applying negative electrode active materials to metal foils, positive electrodes configured by applying positive electrode active materials on metal foils, and separators each being located between and insulating an adjacent pair of the positive and negative electrodes from each other. The case of the rechargeable battery accommodates an electrode assembly and electrolytic solution. A pressure release valve (gas discharge valve), which releases the pressure in the case to the outside of the case, is provided in the case of the rechargeable battery.

PRIOR ART DOCUMENT

Patent Document

Patent Document 1: Japanese Laid-Open Patent Publication No. 2011-181214

SUMMARY OF THE INVENTION

In some cases, the valve body of a gas discharge valve is configured to be substantially elliptical as in the case of the valve body of the gas discharge valve of Patent Document 1 to increase the opening area, for example. The valve body has a groove to promote breaking and opening of the valve body when the pressure in the case reaches a predetermined pressure. For example, the valve body of Patent Document 1 has linear inner grooves and arcuate outer circumferential grooves along the outer circumference. The arcuate grooves are less likely to break and open in comparison to the linear grooves. Accordingly, if the breaking and opening of the arcuate grooves do not progress, an area sufficient as an opening area of the gas discharge valve is not obtained. This may impair speed at the time of releasing the pressure in the case.

An objective of the present invention is to provide a power storage device that rapidly releases the pressure in the case.

To achieve the above described objective, a power storage device including: a case and a pressure release valve is provided. The case accommodates an electrode assembly. The pressure release valve is provided in the case. The pressure release valve releases pressure in the case to an outside of the case. The pressure release valve includes arcuate portions, which configure portions of a circumferential edge of the pressure release valve, intersecting grooves, and a plurality of arcuate grooves connected to ends of the intersecting grooves. The arcuate grooves extend along the arcuate portions. When imaginary straight lines extend along the intersecting grooves, respectively, and intersect the circumferential edge of the pressure release valve, a first region, which is surrounded by the imaginary straight lines and a part of the circumferential edge of the pressure release valve, and a second region, which is surrounded by the imaginary straight lines and another part of the circumferential edge of the pressure release valve, are defined. The first and second regions are configured such that a part of the first region that is in contact with the arcuate portions is larger than a part of the second region that is in contact with the arcuate portions, and the area of the first region is greater than the area of the second region.

According to the above configuration, when the arcuate grooves along the arcuate portions are provided, the area of the first region, which is in contact with the arcuate portions in a larger part, is greater than the area of the second region, which is in contact with the arcuate portions in a smaller part. This increases the area of the first region that receives the pressure in the case to promote the breaking and opening of the arcuate grooves. This enlarges the opening of the pressure release valve to rapidly release the pressure in the case.

In the above described power storage device, it is preferable that the intersecting grooves include two straight grooves. According to this configuration, in the initial stage of the breaking and opening of the pressure release valve, the linear grooves promote the breaking and opening of the pressure release valve. This improves the speed in the case of releasing the pressure in the case.

In the above described power storage device, it is preferable that the circumferential edge of the pressure release valve have an oval track-like shape in which parallel straight portions are connected by the arcuate portions. According to this configuration, the opening of the pressure release valve is set to be greater than in the case of the rectangular pressure release valve. This improves the speed in the case of releasing the pressure in the case.

In the above described power storage device, it is preferable that an angle of the first region formed by the imaginary lines be greater than an angle of the second region formed by the imaginary lines. According to this configuration, the grooves in the vicinity of the intersecting point of the intersecting grooves are set as starting positions of the breaking and opening. This easily starts the breaking and opening from the grooves as starting points. This reduces the variation in the opening shape and the opening area of the pressure release valve.

In the above described power storage device, it is preferable that at least one groove further intersect the intersecting grooves through an intersecting point of the intersecting grooves. According to this configuration, the grooves in the vicinity of the intersecting point of the intersecting grooves are set as starting positions of the breaking and opening. This easily starts the breaking and opening from the grooves as starting points. This reduces the variation in the opening shape and the opening area of the pressure release valve.

In the above described power storage device, it is preferable that the case include a case wall that is rectangular with long sides and short sides, and the at least one groove, which intersects the intersecting grooves, extend along the long sides of the case wall. According to this configuration, when the rectangular case wall includes the pressure release valve, the variation in the opening shape and the opening area of the pressure release valve is reliably reduced.

In the above described power storage device, it is preferable that the pressure release valve include a groove at a position on a rear side of a region including an intersecting point of the intersecting grooves, and the groove on the rear side overlap the region in a thickness direction of the pressure release valve. According to this configuration, the grooves in the vicinity of the intersecting point of the intersecting grooves are set as starting positions of the breaking and opening. This easily starts the breaking and opening from the grooves as starting points. This reduces the variation in the opening shape and the opening area of the pressure release valve.

In the above described power storage device, it is preferable that the pressure release valve include an arcuate groove separating portion at a portion between separate ends of an adjacent pair of the arcuate grooves where the separate ends are located opposite to the intersecting grooves, and a cross sectional area of each arcuate groove separating portion be greater than or equal to 0.0137 times as large as an area of the first region. According to this configuration, the circumferential edge of the first region includes the arcuate groove separating portions in which the arcuate grooves are separated. The cross-sectional area of each arcuate groove separating portion is greater than or equal to 0.0137 times as large as the first region. With such a configuration, the arcuate groove separating portions prevent the fragments of the portion corresponding to the first region from scattering when the pressure release valve breaks and opens.

In the above described power storage device, it is preferable that the pressure release valve include a plurality of continuous grooves and a continuous groove separating portion, and a cross-sectional area of the continuous groove separating portion be greater than or equal to 0.0137 times as large as an area of the second region. The continuous grooves extend along a circumferential edge of the second region. The continuous grooves are continuous with the arcuate grooves and the intersecting grooves. The continuous groove separating portion is at a portion between separate ends of an adjacent pair of the continuous grooves. The separate ends are located opposite to the intersecting grooves. According to this configuration, the circumferential edge of the second region includes the continuous grooves and the continuous groove separating portion in which the continuous grooves are separated. The cross-sectional area of the continuous groove separating portion is greater than or equal to 0.0137 times as large as the area of the second region. With such a configuration, the continuous groove separating portion prevents the fragments of the portion corresponding to the second region from scattering when the pressure release valve breaks and opens.

In the above described power storage device, it is preferable that the pressure release valve include a valve body that is thinner than a board thickness of the case, a plurality of grooves that is continuous with the intersecting grooves, and a separating portion, and a tapered portion or a round portion be provided at at least a portion connected to the separating portions of connecting portions between the case and the lid body, and the tapered portion or the round portion be connected to the valve body. The separating portion is at a portion between separate ends of an adjacent pair of the grooves. The separate ends are located opposite to the intersecting grooves. In this configuration, the separating portion serves as a portion that maintains the state where the fragments of the valve body are prevented from scattering so that they are connected to the case when the pressure release valve breaks and opens. Of the connecting portions between the case and the valve body, the tapered portion or the round portion is located at the portion connected to the separating portion. This increases the strength of the portion at which the tapered portion or the round portion is located. This prevents the fragments of the valve body from scattering.

In the above described power storage device, a preferred example of the power storage device is a rechargeable battery.

In the above described power storage device, it is preferable that the pressure release valve include the intersecting grooves and the arcuate grooves in a front surface of the pressure release valve.

In the above described power storage device, it is preferable that the case include a case wall, the case wall include a front surface located on an outside of the case and a back surface located in the case, and the back surface of the case wall include a groove that overlaps an intersecting point of the intersecting grooves in a thickness direction of the case wall.

Effects of the Invention

According to the present invention, the pressure in the case is rapidly released.

DETAILED DESCRIPTION OF THE PREFERRED EMBODIMENTS

First Embodiment

Hereinafter, a power storage device according to a first embodiment will be described according to FIGS. 1 to 3.

Figure 1:
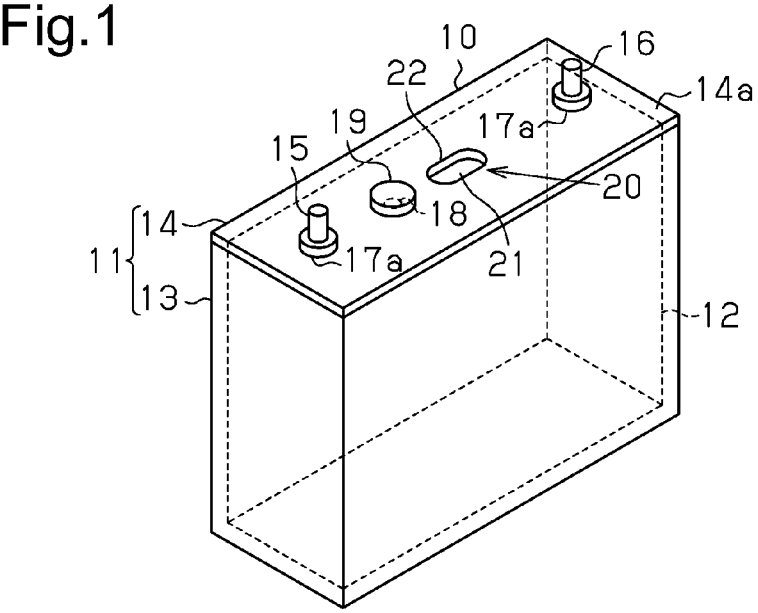
FIG. 1 is a perspective view illustrating the appearance of a rechargeable battery.

As shown in FIG. 1, a rechargeable battery 10 as a power storage device includes an electrode assembly 12 accommodated in a case 11. The case 11 also accommodates electrolytic solution as well as the electrode assembly 12. The case 11 includes a cylindrical case body 13 with a closed end and a plate-like lid body 14, which closes an opening for inserting the electrode assembly 12 into the case body 13. The case body 13 and the lid body 14 are formed of metal (e.g., stainless steel and aluminum). In the rechargeable battery 10 according to the present embodiment, the case body 13 is rectangular and tubular with a closed end, and the lid body 14 is rectangular plate-like. Accordingly, the rechargeable battery 10 is a box-shaped battery forming a box-shaped appearance. The rechargeable battery 10 according to the present embodiment is a lithium ion battery.

The electrode assembly 12 includes positive electrodes, negative electrodes, and separators. Each separator insulates a corresponding pair of the positive electrodes and negative electrodes from each other. Each positive electrode is configured by applying positive electrode active materials to the surfaces of a positive electrode metal foil (aluminum foil). Each negative electrode is configured by applying negative electrode active materials to the surfaces of a negative electrode metal foil (copper foil). The electrode assembly 12 has a laminated structure in which the positive electrodes and the negative electrodes are alternately layered and a separator is located between each adjacent pair of the positive electrodes and negative electrodes. A positive electrode terminal 15 and a negative electrode terminal 16 are electrically connected to the electrode assembly 12. A part of the positive electrode terminal 15 and a part of the negative electrode terminal 16 are exposed through the lid body 14 to the outside of the case 11. Ring-shaped insulating rings 17a for insulating the positive electrode terminal 15 and the negative electrode terminal 16 from the case 11 are attached to the positive electrode terminal 15 and the negative electrode terminal 16.

The lid body 14 of the case 11 is punched to form an inlet 18 for pouring electrolytic solution into the case 11 (case body 13). The inlet 18 is closed by a sealing member 19. The sealing member 19 is fixed to the front surface 14a (surface outside of the case) of the lid body 14 and exposed to the outside of the case 11. A pressure release valve 20 is provided in the case 11. When the pressure in the case 11 reaches a predetermined open pressure, the pressure release valve 20 breaks and opens to expose the inside to the outside of the case so that the pressure in the case 11 does not excessively rise. The pressure release valve 20 is located in the lid body 14 of the case 11 in the present embodiment. In the lid body 14, the sealing member 19 (inlet 18) and the pressure release valve 20 are aligned. The open pressure of the pressure release valve 20 is set as a pressure at which the pressure release valve 20 breaks and opens before a damage such as a crack and a fracture occurs in the case 11 itself or in the joined portion between the case body 13 and the lid body 14. The pressure release valve 20 includes a thin plate-like valve body 21 with a board thickness that is smaller than the board thickness of the lid body 14. The valve body 21 is located at the bottom of a recess 22 formed in the upper surface of the lid body 14, and is formed integrally with the lid body 14.

Figure 2:
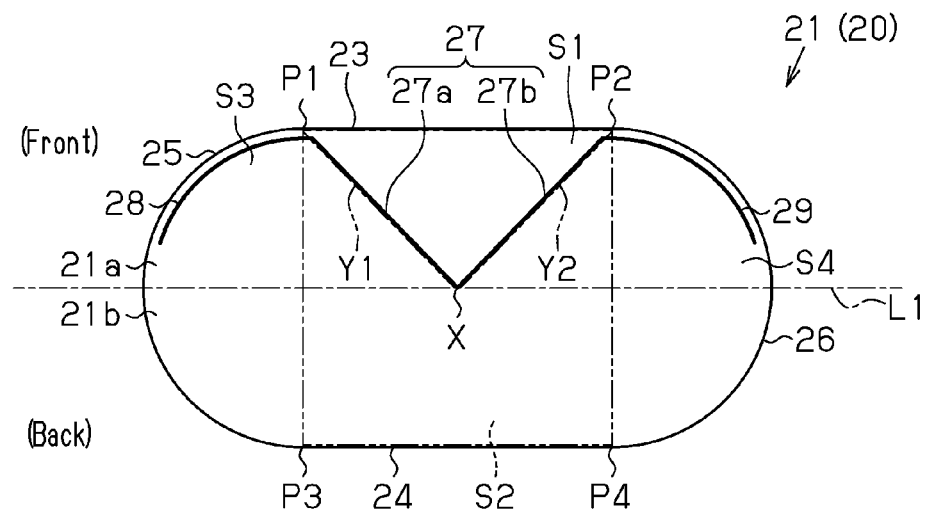
FIG. 2 is a plan view illustrating the front and back surfaces of a valve body according to a first embodiment.
Figure 3:
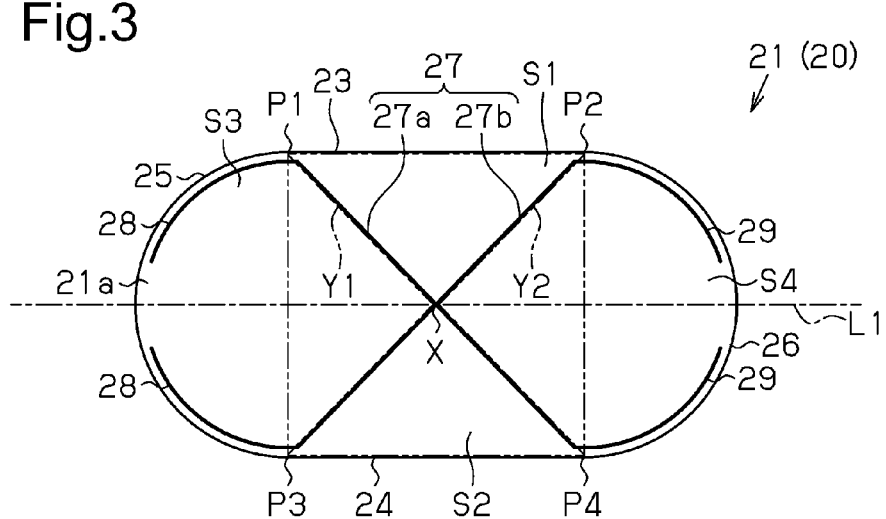
FIG. 3 is a plan view illustrating the front surface of the valve body according to the first embodiment.

As shown in FIGS. 2 and 3, the pressure release valve 20 has an oval track-like circumferential edge formed by connecting two parallel straight portions 23 and 24 with arcuate portions 25 and 26. The valve body 21 is connected to the circumferential edge of the pressure release valve 20 and is oval track-like in the same manner as the pressure release valve 20. FIG. 2 shows a front surface 21a and a back surface 21b of the valve body 21 next to each other. Specifically, in FIG. 2, a bisector L1 shown by a long dashed short dashed line is the boundary between the front and back surfaces 21a and 21b, and bisects the valve body 21 in the direction perpendicular to the direction in which the straight portions 23 and 24 extend.

A first end of the arcuate portion 25 is connected to a first end of the straight portion 23, and a second end of the arcuate portion 25 is connected to a second end of the straight portion 24. A first end of the arcuate portion 26 is connected to a second end of the straight portion 23, and a second end of the arcuate portion 26 is connected to a second end of the straight portion 24. That is, in the present embodiment, the first ends of the straight portions 23 and 24 are connected to each other by the arcuate portion 25, the entirety of which is formed arcuate, and the second ends of the straight portions 23 and 24 are connected to each other by the arcuate portion 26, the entirety of which is formed arcuate. In the pressure release valve 20, portions at which the ends of the straight portions 23 and 24 and the ends of the arcuate portions 25 and 26 are connected correspond to the boundaries P1, P2, P3, and P4 between the straight portions 23, 24 and the arcuate portions 25, 26.

As shown in FIG. 3, the valve body 21 includes a plurality of grooves in the front surface 21a. The grooves include intersecting grooves 27, and arcuate grooves 28 and 29 along the arcuate portions 25 and 26. The intersecting grooves 27 are located in a rectangular region configured by straight lines that connect each adjacent pair of the boundaries P1 to P4 shown by long dashed double-short dashed lines. In the present embodiment, each of the intersecting grooves 27 and the arcuate grooves 28 and 29 includes a V-shaped cross section.

The intersecting grooves 27 are configured by two straight grooves 27a and 27b. The straight groove 27a is located on an imaginary straight line Y1, which connects the boundaries P1 and P4 of the boundaries P1 to P4 between the straight portions 23 and 24 and the arcuate portions 25 and 26. In contrast, the straight groove 27b is located on an imaginary straight line Y2, which connects the boundaries P2 and P3 of the boundaries P1 to P4 between the straight portions 23 and 24 and the arcuate portions 25 and 26. The imaginary straight lines Y1 and Y2 extend along the intersecting grooves 27 and intersect the circumferential edge of the pressure release valve 20. The imaginary straight lines Y1 and Y2 are two straight lines located on the boundaries P1 to P4 between the straight portions 23 and 24 and the arcuate portions 25 and 26. The two straight grooves 27a and 27b intersect at the center of the valve body 21. The boundaries P1 and P4 also serve as intersecting points between the imaginary straight line Y1 and the circumferential edge of the pressure release valve 20, and the boundaries P2 and P3 also serve as intersecting points between the imaginary straight line Y2 and the circumferential edge of the pressure release valve 20.

The valve body 21 includes the two arcuate grooves 28 along the arcuate portion 25 and the two arcuate grooves 29 along the arcuate portion 26 in the front surface 21a. One of the two arcuate grooves 28 is joined to the first end of the straight groove 27a located in the vicinity of the boundary P1 and arcuately extends along the arcuate portion 25. One of the two arcuate grooves 29 is joined to the first end of the straight groove 27b located in the vicinity of the boundary P2 and arcuately extends along the arcuate portion 26. The other one of the two arcuate grooves 28 is joined to the second end of the straight groove 27b located in the vicinity of the boundary P3 and arcuately extends along the arcuate portion 25. The other one of the two arcuate grooves 29 is joined to the second end of the straight groove 27a located in the vicinity of the boundary P4 and arcuately extends along the arcuate portion 26. The lengths of the arcuate grooves 28 and 29 are set such that the ends of the arcuate grooves 28 and 29 opposite to the ends joined to the straight grooves 27a and 27b are located at positions apart from the bisector L1 by a predetermined distance. That is, the arcuate grooves 28 and 29 are provided along parts of the arcuate portions 25 and 26. As described above, the valve body 21 includes the arcuate groove 28 and the arcuate groove 29, which are joined to the straight groove 27a, and the arcuate groove 28 and the arcuate groove 29, which are joined to the straight groove 27b.

When the imaginary straight lines Y1 and Y2 extend along the intersecting grooves 27, a plurality of regions S1, S2, S3, and S4 surrounded by the imaginary straight lines Y1 and Y2 and the circumferential edge of the pressure release valve 20 are defined on the front surface 21a of the valve body 21. The region S1 is defined by a part of the imaginary straight line Y1 located between the boundary P1 and the intersecting point X of the straight grooves 27a and 27b, a part of the imaginary straight line Y2 located between the boundary P2 and the intersecting point X, and the straight portion 23. The region S2 is defined by a part of the imaginary straight line Y2 located between the intersecting point X and the boundary P3, a part of the imaginary straight line Y1 located between the intersecting point X and the boundary P4, and the straight portion 24. The region S1 and the region S2 are symmetrical about the intersecting point X.

The region S3 is defined by a part of the imaginary straight line Y1 located between the intersecting point X and the boundary P1, a part of the imaginary straight line Y2 located between the intersecting point X and the boundary P3, and the arcuate portion 25. The region S4 is defined by a part of the imaginary straight line Y2 located between the intersecting point X and the boundary P2, a part of the imaginary straight line Y1 located between the intersecting point X and the boundary P4, and the arcuate portion 26. The region S3 and the region S4 are symmetrical about the intersecting point X.

In the present embodiment, the regions S1 and S2 are in contact with only the straight portions 23 and 24 when the imaginary straight lines Y1 and Y2 are located in the rectangular region configured by connecting the straight lines shown by long dashed double-short dashed lines in FIGS. 2 and 3. In contrast, in the present embodiment, the regions S3 and S4 include the corresponding arcuate portions 25 and 26 and are in contact with the entire corresponding arcuate portions 25 and 26. In the present embodiment, the regions S1 and S2 correspond to a second region with smaller parts in contact with the arcuate portions 25 and 26, and the regions S3 and S4 correspond to a first region with larger parts in contact with the arcuate portions 25 and 26. That is, the parts of the regions S3 and S4 that are in contact with the arcuate portions 25 and 26 is larger than the parts of the regions S1 and S2 that are in contact with the arcuate portions 25 and 26. As for the area of the four regions S1 to S4 located on the front surface 21a of the valve body 21, the area of the regions S3 and S4 with larger parts in contact with the arcuate portions 25 and 26 is greater than the area of the regions S1 and S2 with smaller parts in contact with the arcuate portions 25 and 26. That is, the area of the region S3 is greater than the area of any one of the regions S1 and S2, and the area of the region S4 is greater than the area of any one of the regions S1 and S2.

Next, the operation of the present embodiment will be described.

The pressure in the case 11 acts on the back surface 21b of the valve body 21, which serves as a pressure receiving surface, to expand the valve body 21 outward. In each groove of the valve body 21, stress occurs with the pressure applied from the inner side of the case 11. When the pressure in the case 11 reaches the open pressure, the valve body 21 breaks and opens with the grooves as starting points that are in the vicinity of the intersecting point X of the straight grooves 27a and 27b in which the stress is most concentrated. The breaking and opening of the valve body 21 divides the four regions S1 to S4 along the straight grooves 27a and 27b, which define the regions S1 to S4. As the breaking and opening of the straight grooves 27a and 27b reach the ends of the straight grooves 27a and 27b joined to the arcuate grooves 28 and 29, the breaking and opening of the arcuate grooves 28 and 29 start as well.

At this time, in the present embodiment, the area of the regions S3 and S4, which are in contact with the arcuate portions 25 and 26, is greater than the area of the regions S1 and S2, which are in contact with only the straight portions 23 and 24. That is, the pressure receiving area of the regions S3 and S4 is greater than the pressure receiving area of the regions S1 and S2. Accordingly, as for the size of the pressure applied from the inner side of the case 11 to the back surface 21b of the valve body 21, the magnitude of the pressure applied to the regions S3 and S4 is greater than the magnitude of the pressure applied to the regions S1 and S2.

Accordingly, when the grooves located in the front surface 21a of the valve body 21 break and open, the valve body 21 is divided into the four regions S1 to S4 and turned outward. This generates a large opening in the pressure release valve 20. The pressure in the case 11 is released through the opening generated in the pressure release valve 20 to the outside of the case 11.

Accordingly, the following advantages are obtained according to the present embodiment.

(1) The arcuate grooves 28 and 29 are less likely to break and open in comparison to the straight grooves 27a and 27b. Accordingly, the area of the regions S3 and S4 with the more portions that are in contact with the arcuate portions 25 and 26 is greater than the area of the regions S1 and S2 with the less portions that are in contact with the arcuate portions 25 and 26. This increases the pressure received by the regions S3 and S4. Accordingly, even in the pressure release valve 20, which includes the arcuate grooves 28 and 29 along the arcuate portions 25 and 26 to enlarge the opening of the pressure release valve 20, the breaking and opening of the arcuate grooves 28 and 29 are promoted so that the regions S3 and S4 are easily opened outward. This allows the pressure release valve 20 to open in a balanced manner to enlarge the opening of the pressure release valve 20. That is, the pressure in the case 11 is rapidly released.

When the amount of the pressure received by the regions S3 and S4 with the portions that are in contact with the arcuate portions 25 and 26 is small, the breaking and opening of the arcuate grooves 28 and 29 may be insufficient. That is, if the opening of the pressure release valve 20 is less balanced, the arcuate grooves 28 and 29 do not fully break and open. Accordingly, the opening of the pressure release valve 20 is made small. This impairs the speed of releasing the pressure in the case 11.

(2) The intersecting grooves 27 include the two straight grooves 27a and 27b. Accordingly, the straight grooves 27a and 27b promote the breaking and opening of the valve body 21 in the early stage of the breaking and opening. This improves the speed of releasing the pressure in the case 11.

(3) The pressure release valve 20 is oval track-shaped. This sets the opening of the pressure release valve 20 large in comparison to the case where the pressure release valve 20 is formed rectangular. This improves the speed of releasing the pressure in the case 11.

(4) The imaginary straight lines Y1 and Y2 along the intersecting grooves 27 are located on the boundaries P1 to P4 between the straight portions 23, 24 and the arcuate portions 25, 26. Accordingly, in the four regions S1 to S4, the pressure applied to the regions S1 and S2 with the less portions that are in contact with the arcuate portions 25 and 26 and the pressure applied to the regions S3 and S4 with the more portions that are in contact with the arcuate portions 25 and 26 are not excessively one-sided. This ensures the regions S1 to S4 to be divided. Accordingly, the opening of the pressure release valve 20 is enlarged to improve the speed of releasing the pressure in the case 11.

(5) The straight grooves 27a and 27b extend to the vicinity of the boundaries P1 to P4. This arranges the arcuate grooves 28 and 29 along the arcuate portions 25 and 26. This enlarges the opening of the pressure release valve 20 when the grooves of the valve body 21 are broken and opened.

(6) The straight grooves 27a and 27b are joined to the arcuate grooves 28 and 29. Accordingly, after the breaking and opening of the straight grooves 27a and 27b, the breaking and opening rapidly shift to the arcuate grooves 28 and 29. In the pressure release valve 20, the breaking and opening of the straight grooves 27a and 27b divide the regions S1 to S4. In accordance with the progress of the breaking and opening, the valve body 21 is turned outward to generate the opening. The pressure is released through the opening to the outside of the case 11. The breaking and opening promptly shift from the straight grooves 27a and 27b to the arcuate grooves 28 and 29. This ensures a sufficient amount of opening of the pressure release valve 20.

(7) The arcuate grooves 28 and 29 are provided to be along corresponding parts of the arcuate portions 25 and 26. Grooves are not provided along the straight portions 23 and 24. Accordingly, even if the grooves in the valve body 21 break and open and the valve body 21 is turned outward, the portions of the valve body 21 in which the grooves are not provided are connected. This prevents scattering of fragments of the valve body 21.

Second Embodiment

Hereinafter, a power storage device according to a second embodiment will be described according to FIGS. 4 and 5.

Description of the same components in the second embodiment as those in the first embodiment described above are omitted or simplified.

Figure 4:
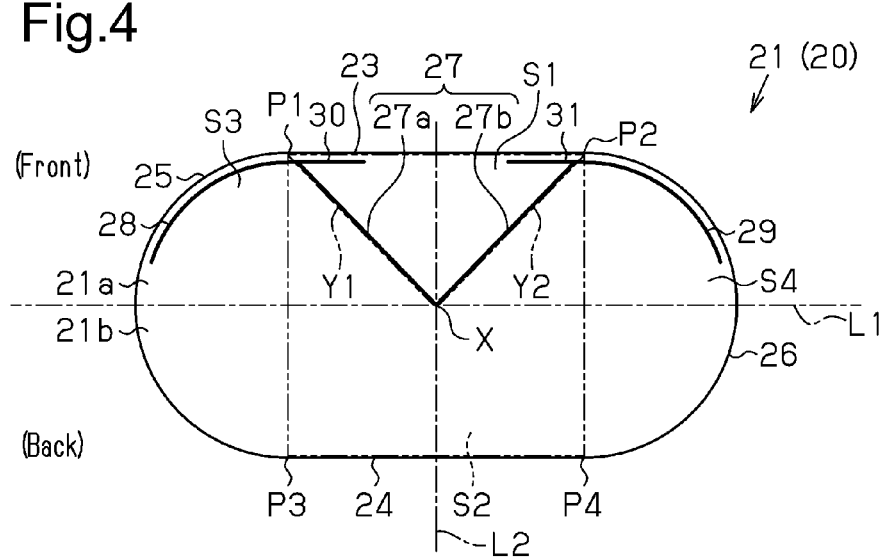
FIG. 4 is a plan view illustrating the front and back surfaces of a valve body according to a second embodiment.
Figure 5:
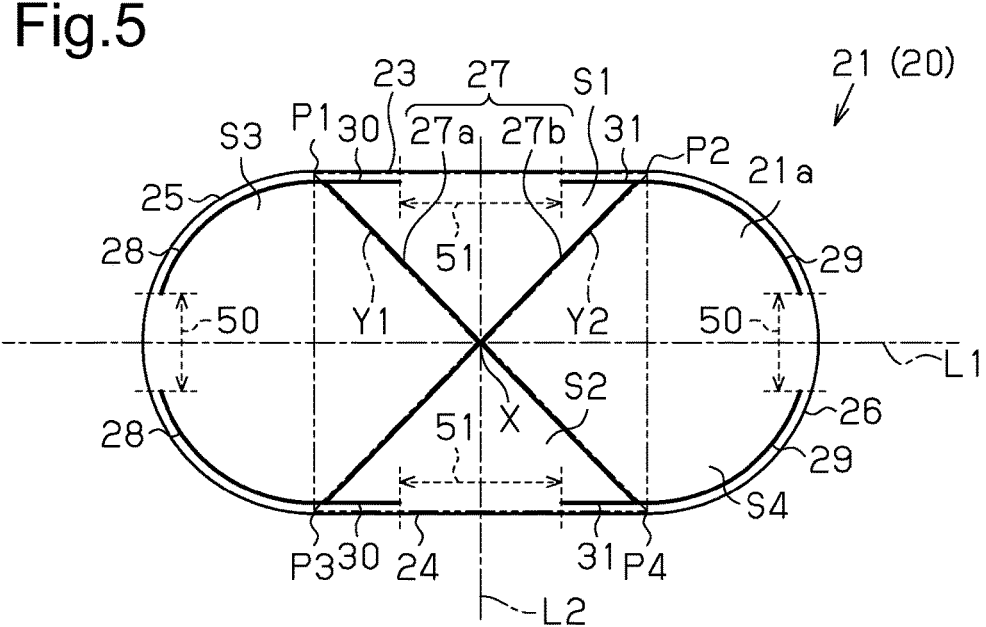
FIG. 5 is a plan view illustrating the front surface of the valve body according to the second embodiment.

As shown in FIGS. 4 and 5, the valve body 21 according to the present embodiment includes a plurality of linear grooves 30 and 31 along the straight portions 23 and 24 in addition to the intersecting grooves 27 (straight groove 27a and straight groove 27b) and the arcuate grooves 28 and 29 in the front surface 21a. In the present embodiment, the linear grooves 30 and 31 have V-shaped cross sections. FIG. 4 shows the front surface 21a and the back surface 21b of the valve body 21 next to each other. Specifically, in FIG. 3, a bisector L1 shown by a long dashed short dashed line is the boundary between the front and back surfaces 21a and 21b, and bisects the valve body 21 in the direction perpendicular to the direction in which the straight portions 23 and 24 extend.

The valve body 21 includes the two linear grooves 30 and 31 along the straight portion 23 and the two linear grooves 30 and 31 along the straight portion 24 in the front surface 21a. One of the two linear grooves 30 is joined to the first end of the straight groove 27a located in the vicinity of the boundary P1 and linearly extends along the straight portion 23. One of the two linear grooves 31 is joined to the first end of the straight groove 27b located in the vicinity of the boundary P2 and linearly extends along the straight portion 23. The other one of the two linear grooves 30 is joined to the second end of the straight groove 27b located in the vicinity of the boundary P3 and linearly extends along the straight portion 24. The other one of the two linear grooves 31 is joined to the second end of the straight groove 27a located in the vicinity of the boundary P4 and linearly extends along the straight portion 24.

The lengths of the linear grooves 30 and 31 are determined such that the positions of the ends of the linear grooves 30 and 31 opposite to the ends of the linear grooves 30 and 31, which are joined to the straight grooves 27a and 27b, are apart from a perpendicular line L2 by a predetermined distance. The perpendicular line L2 passes through the intersecting point X and perpendicularly intersects the bisector L1. That is, the linear grooves 30 and 31 are provided along parts of the straight portions 23 and 24. As described above, the valve body 21 includes the linear groove 30 and the linear groove 31, which are joined to the straight groove 27a, and the linear groove 30 and the linear groove 31, which are joined to the straight groove 27b. In the present embodiment, the linear grooves 30 and 31 are located in the corresponding regions S1 and S2. The region S1 and the region S2 are symmetrical about the intersecting point X. The linear grooves 30 and 31 are also joined to the arcuate grooves 28 and 29, which are joined to the ends of the straight grooves 27a and 27b.

Next, the operation of the present embodiment will be described.

In the present embodiment, the breaking and opening of the straight grooves 27a and 27b and the arcuate grooves 28 and 29, and the division of the regions S1 to S4 are performed in the same manner as described in the operation of the first embodiment. In the present embodiment, as the breaking and opening of the straight grooves 27a and 27b reach the ends of the straight grooves 27a and 27b joined to the linear grooves 30 and 31, the breaking and opening of linear grooves 30 and 31 start as well as the breaking and opening of the arcuate grooves 28 and 29. This divides parts of the valve body 21 along the straight portions 23 and 24 at the regions S1 and S2. When the grooves located in the front surface 21a of the valve body 21 break and open, the valve body 21 is divided into the four regions S1 to S4 and turned outward. This generates a large opening in the pressure release valve 20.

The present embodiment has the following advantages in addition to the advantages (1) to (7) of the first embodiment.

(8) The linear grooves 30 and 31 promote the turning of the regions S1 and S2 outward. That is, the breaking and opening of the linear grooves 30 and 31 facilitate the regions S1 and S2 to open outward. This allows the pressure release valve 20 to open in a balanced manner to enlarge the opening of the pressure release valve 20. That is, the pressure in the case 11 is rapidly released.

(9) The linear grooves 30 and 31 are provided to be along the corresponding parts of the straight portions 23 and 24. This prevents scattering of fragments of the valve body 21.

Third Embodiment

Hereinafter, a power storage device according to a third embodiment will be described according to FIGS. 6 and 7.

Figure 6:
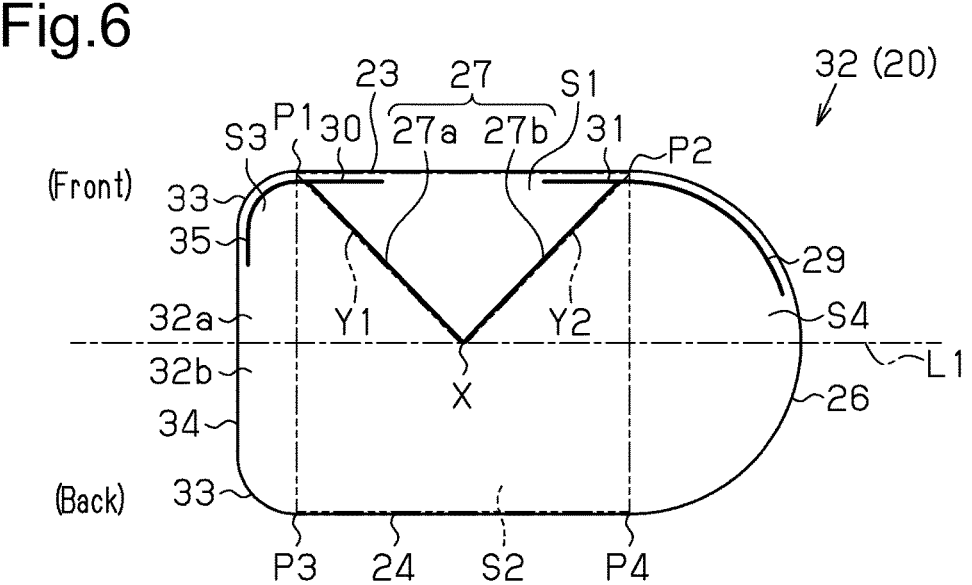
FIG. 6 is a plan view illustrating the front and back surfaces of a valve body according to a third embodiment.
Figure 7:
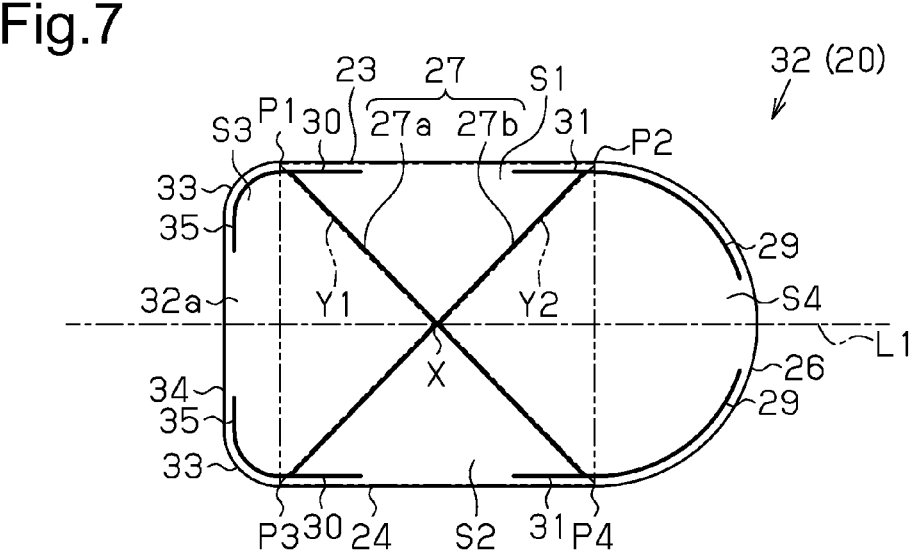
FIG. 7 is a plan view illustrating the front surface of the valve body according to the third embodiment.

As shown in FIGS. 6 and 7, a valve body 32 according to the present embodiment differs from the valve body 21 of the first and second embodiments in a part of the shape of the valve body 32. The valve body 32 has parallel straight portions 23 and 24. Two arcuate portions 33 are connected to the first ends of the straight portions 23 and 24, respectively. The arcuate portions 33 each have a curvature radius that is smaller than the curvature radius of the arcuate portion 26, which connects the second ends of the straight portions 23 and 24. The two arcuate portions 33 are connected to the straight portion 34. Accordingly, the valve body 32 according to the present embodiment is substantially oval track-shaped. The shape of the valve body 32 corresponds to a shape of the circumferential edge of the pressure release valve in the present embodiment. Portions at which the ends of the straight portions 23 and 24 and the ends of the arcuate portions 26 and 33 are connected correspond to the boundaries P1, P2, P3, and P4 between the straight portions 23, 24 and the arcuate portions 26, 33. FIG. 4 shows the front surface 32a and the back surface 32b of the valve body 32 next to each other. Specifically, in FIG. 6, a bisector L1 shown by a long dashed short dashed line is the boundary between the front and back surfaces 32a and 32b, and bisects the valve body 32 in the direction perpendicular to the direction in which the straight portions 23 and 24 extend.

The valve body 32 has a plurality of grooves in the front surface 32a. The grooves include a plurality of arcuate grooves 29 and 35 along the corresponding arcuate portions 26 and 33, and the linear grooves 30 and 31. In the present embodiment, the arcuate grooves 35 have a V-shaped cross section. The valve body 32 includes the two arcuate grooves 35 in the front surface 32a. One of the two arcuate grooves 35 is joined to the first end of the straight groove 27a located in the vicinity of the boundary P1 and arcuately extends along the arcuate portion 33. In contrast, the other one of the two arcuate grooves 35 is joined to the second end of the straight groove 27b located on the boundary P3 side and arcuately extends along the arcuate portion 33. The lengths of the two arcuate grooves 35 are determined such that the positions of the ends of the arcuate grooves 35 opposite to the ends of the arcuate grooves 35, which are joined to the straight grooves 27a and 27b, are apart from the bisector L1 by a predetermined distance.

When the imaginary straight lines Y1 and Y2 extend along the intersecting grooves 27, a plurality of the regions S1, S2, S3, and S4 are defined in the front surface 32a of the valve body 32 in the same manner as in the first and second embodiments. The regions S1, S2, and S4 are the same as the regions S1, S2, and S4 of the first and second embodiments. In contrast, the region S3 according to the present embodiment is a region defined by a part of the imaginary straight line Y1 located between the intersecting point X and the boundary P1, a part of the imaginary line Y2 located between the intersecting point X and the boundary P3, the two arcuate portions 33, and the straight portion 34. In the present embodiment, the region S3 includes more portions that are in contact with the arcuate portions 33. The area of the region S3 is greater than the area of each of the regions S1 and S2 and smaller than the area of the region S4.

Next, the operation of the present embodiment will be described.

In the present embodiment, the breaking and opening of the straight grooves 27a and 27b, the arcuate grooves 29 and 35, and the linear grooves 30 and 31, and the division of the regions S1 to S4 are performed in the same manner as described in the operations of the first and second embodiments. When the grooves located in the front surface 32a of the valve body 32 break and open, the valve body 32 is divided into the four regions S1 to S4 and turned outward. This generates a large opening in the pressure release valve 20.

The present embodiment has the following advantage in addition to the advantages (1) to (7) of the first embodiment and the advantages (8) and (9) of the second embodiment. The advantage (3) is also obtained by the substantially oval track shape as of the valve body 32 of the present embodiment. As for the advantages (4) to (7), the arcuate portion 25 is replaced by the arcuate portions 33, and the arcuate grooves 28 are replaced by the arcuate grooves 35.

(10) The arcuate grooves 35 are provided to be along the corresponding arcuate portions 33. Grooves are not provided along the entire straight portion 34. This prevents scattering of fragments of the valve body 21 in the region S3.

Fourth Embodiment

Hereinafter, a power storage device according to a fourth embodiment will be described according to FIG. 8.

Figure 8:
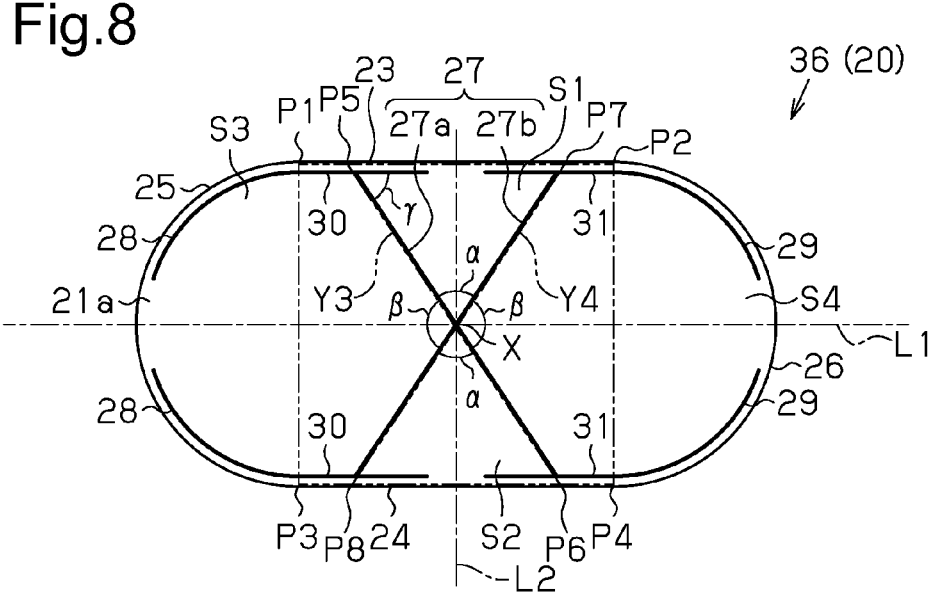
FIG. 8 is a plan view illustrating the front surface of a valve body according to a fourth embodiment.

As shown in FIG. 8, the valve body 36 of the pressure release valve 20 includes the intersecting grooves 27 (straight groove 27a and straight groove 27b), the arcuate grooves 28 and 29, and the linear grooves 30 and 31 in the front surface 21a in the same manner as the valve body 21 in the second embodiment. The straight groove 27a of the present embodiment is positioned on an imaginary straight line Y3 that extends along the straight groove 27a and connects intersecting points P5 and P6 at which the imaginary straight line Y3 intersects the straight portions 23 and 24 as the circumferential edge of the pressure release valve 20. The intersecting point P5 is located at a position that is away from the boundary P1 and in the vicinity of the boundary P2. The intersecting point P6 is located at a position that is away from the boundary P4 and in the vicinity of the boundary P3. In contrast, the straight groove 27b of the present embodiment is positioned on an imaginary straight line Y4 that extends along the straight groove 27b and connects intersecting points P7 and P8 at which the imaginary straight line Y4 intersects the straight portions 23 and 24 as the circumferential edge of the pressure release valve 20. The intersecting point P7 is located at a position that is away from the boundary P2 and in the vicinity of the boundary P1.

The intersecting point P8 is located at a position that is away from the boundary P3 and in the vicinity of the boundary P4.

When the imaginary straight lines Y3 and Y4 extend along the intersecting grooves 27, a plurality of regions S1, S2, S3, and S4 surrounded by the imaginary straight lines Y3 and Y4 and the circumferential edge of the pressure release valve 20 are defined on the front surface 21a of the valve body 36. The region S1 is a region defined by a part of the imaginary straight line Y3 located between the intersecting point P5 and the intersecting point X of the straight grooves 27a and 27b, a part of the imaginary straight line Y4 located between the intersecting point X and the intersecting point P7, and a part of the straight portion 23. The region S2 is a region defined by a part of the imaginary straight line Y4 located between the intersecting point X and the intersecting point P8, a part of the imaginary straight line Y3 located between the intersecting point X and the intersecting point P6, and a part of the straight portion 24. The region S1 and the region S2 are symmetrical about the intersecting point X. In the regions S1 and S2, the imaginary straight lines Y3 and Y4 intersect and form an angle α. The angle α is an inner angle formed by intersecting the imaginary straight lines Y3 and Y4. The angle α is also an angle formed by the intersecting grooves 27 along the regions S1 and S2.

The region S3 is a region defined by a part of the imaginary straight line Y3 located between the intersecting point X and the intersecting point P5, a part of the imaginary straight line Y4 located between the intersecting point X and the intersecting point P8, parts of the straight portions 23 and 24, and the arcuate portion 25. The region S4 is a region defined by a part of the imaginary straight line Y4 located between the intersecting point X and the intersecting point P7, a part of the imaginary straight line Y3 located between the intersecting point X and the intersecting point P6, parts of the straight portions 23 and 24, and the arcuate portion 26. The region S3 and the region S4 are symmetrical about the intersecting point X. In the regions S3 and S4, the imaginary straight lines Y3 and Y4 intersect and form an angle β. The angle β is an inner angle formed by intersecting the imaginary straight lines Y3 and Y4. The angle β is also an angle formed by the intersecting grooves 27 along the regions S3 and S4.

In the present embodiment, the regions S1 and S2 correspond to the second region with less portions that are in contact with the arcuate portions 25 and 26, and the regions S3 and S4 correspond to the first region with more portions that are in contact with the arcuate portions 25 and 26. In the present embodiment, as for the area of the four regions S1 to S4, the area of the regions S3 and S4 with the more portions that are in contact with the arcuate portions 25 and 26 is also greater than the area of the regions S1 and S2 with the less portions that are in contact with the arcuate portions 25 and 26.

In the present embodiment, the angle β in the regions S3 and S4 is greater than the angle α in the regions S1 and S2. As for the angle of the intersecting imaginary straight lines Y3 and Y4, the shorter the distance between the intersecting points P5 and P7 on the same straight portion 23 is, the smaller the angle α becomes. The smaller the angle α is, the greater the angle β becomes.

Next, the operation of the present embodiment will be described.

In the present embodiment, the breaking and opening of the straight grooves 27a and 27b, the arcuate grooves 28 and 29, and the linear grooves 30 and 31, and the division of the regions S1 to S4 are performed in the same manner as described in the operations of the first and second embodiments.

The angle β is enlarged to be greater than the angle α as in the intersecting grooves 27 of the present embodiment. As the angle α is decreased, an angle γ formed between the straight grooves 27a, 27b and the linear grooves 30, 31 is increased. This relieves stress concentrating at the intersecting points between the straight grooves 27a, 27b and the linear grooves 30, 31. In contrast, as the angle α is decreased, the portions forming the angle α becomes sharp. This easily center the pressure applied from the inner side of the case 11 on portions in the vicinity of the intersecting point X. This facilitates the starting of the breaking and opening of the grooves as starting points in the vicinity of the intersecting point X.

When the angle β is set to be less than or equal to the angle α, the angle γ is decreased as the angle α is increased. This sharpens the portions that form the angle γ. Accordingly, the pressure applied from the inner side of the case 11 is easily concentrated on the portions in the vicinity of the intersecting points between the straight grooves 27a, 27b and the linear grooves 30, 31. This facilitates the starting of the breaking and opening of the grooves as starting points in the vicinity of the intersecting points.

The present embodiment has the following advantage in addition to the advantages (1) to (7) of the first embodiment and the advantages (8) and (9) of the second embodiment.

(11) Of the angles formed by the intersecting grooves 27, the angle β is set to be greater than the angle α. This determines parts of the intersecting grooves 27 in the vicinity of the intersecting point X as positions at which the breaking and opening are started so that the breaking and opening are easily started from the grooves as starting points. This reduces the variation in the opening shape and the opening area of the pressure release valve 20.

Fifth Embodiment

Hereinafter, a power storage device according to a fifth embodiment will be described according to FIGS. 1 and 9.

As shown in FIG. 1, the lid body 14 as a case wall, which includes the pressure release valve 20, is rectangular with long sides and short sides.

Figure 9:
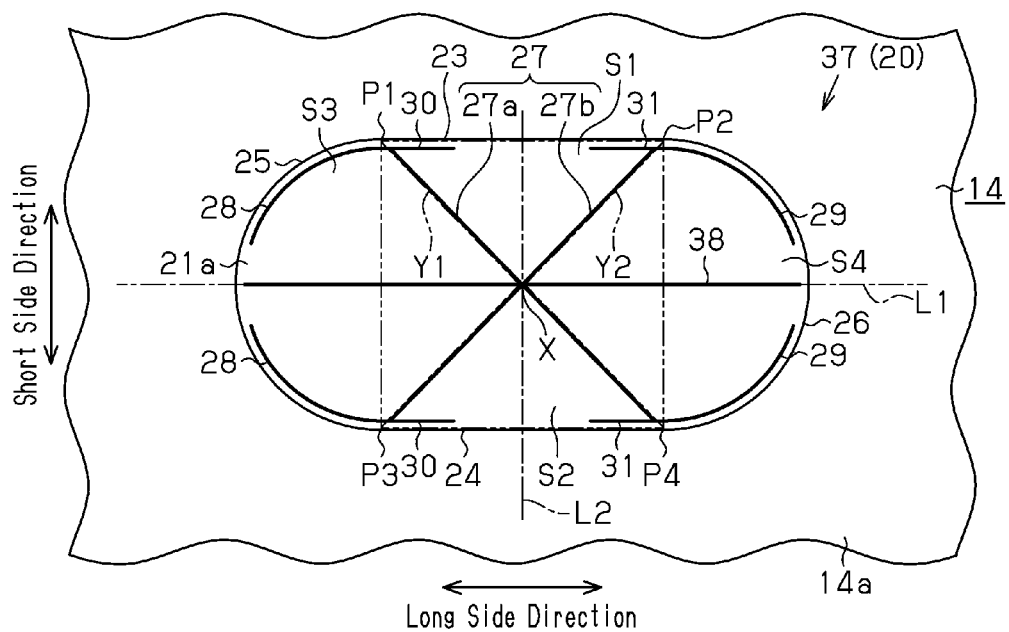
FIG. 9 is a plan view illustrating the front surface of a valve body according to a fifth embodiment.

As shown in FIG. 9, the pressure release valve 20 is located such that the direction in which the straight portions 23 and 24 extend corresponds to the long side direction of the lid body 14. A valve body 37 of the pressure release valve 20 includes a straight groove 38, which linearly extends in the direction in which the straight portions 23 and 24 extend, in addition to the intersecting grooves 27, the arcuate grooves 28 and 29, and the linear grooves 30 and 31 in the front surface 21a as in the valve body 21 of the second embodiment. The straight groove 38 extends through the intersecting point X of the intersecting grooves 27. The straight groove 38 extends to the ends of the arcuate grooves 28 and 29 and has a length that is slightly shorter than the length of the pressure release valve 20 in the long side direction of the lid body 14 and substantially the same as the entire length of the pressure release valve 20.

In the front surface 21a of the valve body 37, three grooves, i.e., the straight groove 27a, the straight groove 27b, and the straight groove 38 intersect. Of the three intersecting grooves, the straight groove 38 extends in the long side direction of the lid body 14.

Next, the operation of the present embodiment will be described.

In the present embodiment, the breaking and opening of the straight grooves 27a and 27b, the arcuate grooves 28 and 29, and the linear grooves 30 and 31, and the division of the regions S1 to S4 are performed in the same manner as described in the operations of the first and second embodiments.

The pressure in the case 11 is added to the valve body 37 such that the back surface 21b of the valve body 37 serves as a pressure receiving surface. This expands the valve body 37 outward. At this time, the rectangular lid body 14 with the long and short sides has different deformation curvatures in the long side direction and the short side direction. The deformation affects the valve body 37 in the same manner. Accordingly, in the valve body 37 of the present embodiment, the straight groove 38 is located in the long side direction in which the deformation curvature is small. The long side direction is perpendicular to the short side direction. The straight groove 38 extends through the intersecting point X of the intersecting grooves 27. Accordingly, the pressure applied from the inner side of the case 11 is easily concentrated on the portions in the vicinity of the intersecting point X. This facilitates the starting of the breaking and opening of the grooves as starting points in the vicinity of the intersecting point X.

The present embodiment has the following advantage in addition to the advantages (1) to (7) of the first embodiment and the advantages (8) and (9) of the second embodiment.

(12) The straight groove 38, which passes through the intersecting point X of the intersecting grooves 27, is added. This determines parts of the intersecting grooves 27 in the vicinity of the intersecting point X as positions at which the breaking and opening are started so that the breaking and opening are easily started from the grooves as starting points. This reduces the variation in the opening shape and the opening area of the pressure release valve 20.

Sixth Embodiment

Hereinafter, a power storage device according to a sixth embodiment will be described according to FIGS. 10 to 12.

Figure 10:
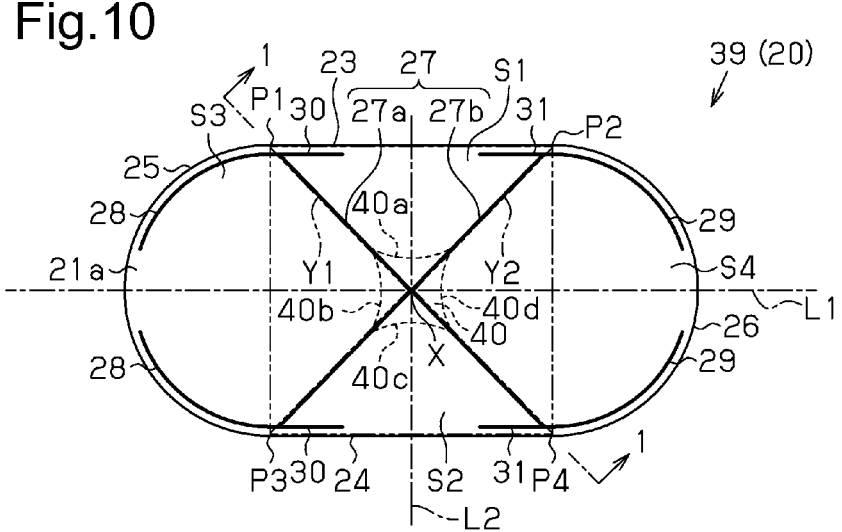
FIG. 10 is a plan view illustrating the front surface of a valve body according to a sixth embodiment.
Figure 11:
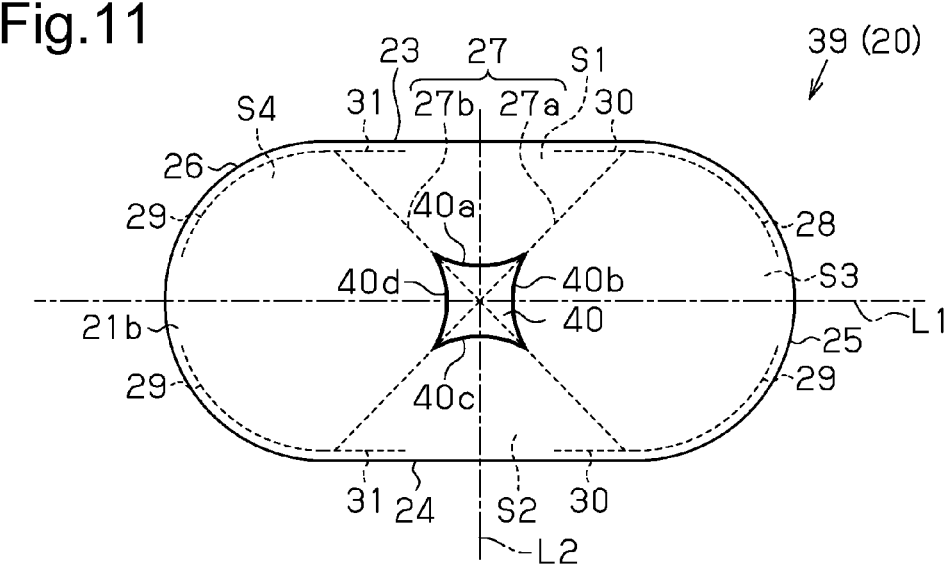
FIG. 11 is a plan view illustrating a back surface of the valve body according to the sixth embodiment.

As shown in FIG. 10, the valve body 39 of the pressure release valve 20 includes the intersecting grooves 27, the arcuate grooves 28 and 29, and the linear grooves 30 and 31 in the front surface 21a in the same manner as the valve body 21 of the second embodiment. In contrast, the back surface 21b of the valve body 39 of the pressure release valve 20 has a groove 40. The groove 40 has a shape surrounded by four curved walls 40a, 40b, 40c, and 40d, which are curved toward the central portion of the groove 40. The groove 40 is recessed at a position in which the groove 40 overlaps the intersecting point X of the intersecting grooves 27 in the thickness direction of the lid body 14. The groove includes the intersecting point X of the intersecting grooves 27 and has a size such that the groove 40 overlaps parts of the straight grooves 27a and 27b. Accordingly, the groove 40 is located at a position in the pressure release valve 20 that is opposite to the region including the intersecting point X of the intersecting grooves 27 in which the groove 40 overlaps the region in the thickness direction of the pressure release valve 20.

Figure 12:
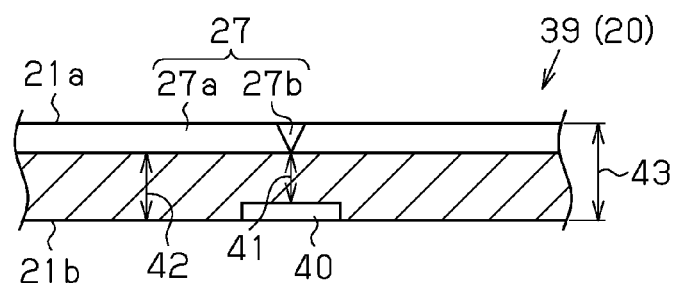
FIG. 12 is a cross-sectional view taken along line 1-1 of FIG. 10.

As shown in FIG. 12, the pressure release valve 20 of the present embodiment has a thin film portion 41 between the bottom of the groove 40 and the bottom of the intersecting grooves 27 with which the groove 40 overlaps. The thickness of the thin film portion 41 is smaller than the thickness of the thin film portion 42 between the back surface 21b of the valve body 39 and the bottoms of the intersecting grooves 27 that are not overlapped with the groove 40 by the depth of the groove 40. The board thickness of each of the thin film portion 41 and the thin film portion 42 is smaller than the board thickness 43 of the valve body 39.

Next, the operation of the present embodiment will be described.

In the present embodiment, the breaking and opening of the straight grooves 27a and 27b, the arcuate grooves 28 and 29, and the linear grooves 30 and 31, and the division of the regions S1 to S4 are performed in the same manner as described in the operations of the first and second embodiments.

The valve body 39 of the present embodiment includes the intersecting point X of the intersecting grooves 27. The portion of the valve body 39 with which the bottom of the groove 40 overlaps is the thinnest at the thin film portion 41. Accordingly, the pressure applied from the inner side of the case 11 is easily concentrated on the portions in the vicinity of the intersecting point X. This facilitates the starting of the breaking and opening of the grooves as starting points in the vicinity of the intersecting point X.

The present embodiment has the following advantage in addition to the advantages (1) to (7) of the first embodiment and the advantages (8) and (9) of the second embodiment.

(13) The groove 40 in the back surface 21b of the valve body 39 determines the grooves in the vicinity of the intersecting point X of the intersecting grooves 27 as starting grooves in which the breaking and opening are started so that the breaking and opening are easily started from the grooves as starting points. This reduces the variation in the opening shape and the opening area of the pressure release valve 20.

Seventh Embodiment

Hereinafter, a power storage device according to a seventh embodiment will be described according to FIG. 5.

As shown in FIG. 5, the valve body 21 of the pressure release valve 20 includes the intersecting grooves 27, the arcuate grooves 28 and 29, and the linear grooves 30 and 31 as continuous grooves in the front surface 21a. The ends of the arcuate grooves 28 opposite to the intersecting grooves 27 are separate from each other, and the ends of the arcuate grooves 29 opposite to the intersecting grooves 27 are separate from each other. The valve body 21 has arcuate groove separating portions 50 at the separating portions. The cross-sectional areas of the arcuate groove separating portions 50 is set greater than or equal to 0.0137 times as large as the area of the regions S3 and S4 as a first region. The cross-sectional area of each arcuate groove separating portion 50 may be a cross-sectional area along an imaginary straight line connecting the ends of the corresponding arcuate grooves 28 and 29, or a cross-sectional area along an imaginary curved line connecting the ends along the corresponding one of the arcuate portions 25 and 26.

The ends of each pair of the linear grooves 30 and the linear grooves 31 opposite to the intersecting grooves 27 are separate from each other. The valve body 21 has linear groove separating portions 51 as continuous groove separating portions between the corresponding pair the separate portions. The cross-sectional areas of the linear groove separating portions 51 is set greater than or equal to 0.0137 times as large as the area of the regions S3 and S4 as a first region. The cross-sectional area of each linear groove separating portion 51 is a cross-sectional area along an imaginary straight line connecting the ends of the corresponding pair of the linear grooves 30 and 31.

Next, the operation of the present embodiment will be described.

In the present embodiment, the breaking and opening of the straight grooves 27a and 27b, the arcuate grooves 28 and 29, and the linear grooves 30 and 31, and the division of the regions S1 to S4 are performed in the same manner as described in the operations of the first and second embodiments.

The present embodiment has the following advantage in addition to the advantages (1) to (7) of the first embodiment and the advantages (8) and (9) of the second embodiment.

(14) The shorter the arcuate groove separating portions 50 are, the smaller the cross-sectional areas of the arcuate groove separating portions 50 become. Accordingly, the portions of the circumferential edges of the regions S3 and S4 in which the grooves are not provided become smaller. In this case, when the pressure in the case 11 is increased and the pressure release valve 20 is broken and opened, the portions of the valve body 21 corresponding to the regions S3 and S4 are scattered from the case 11. Accordingly, the arcuate groove separating portions 50 are provided such that the cross-sectional areas of the arcuate groove separating portions 50 is greater than or equal to 0.0137 times as large as the area of the regions S3 and S4. This prevents the portions corresponding to the regions S3 and S4 from scattering as described above.

The shorter the linear groove separating portions 51 are, the smaller the cross-sectional areas of the linear groove separating portions 51 become. Accordingly, the portions of the circumferential edges of the regions S1 and S2 in which the grooves are not provided become smaller. In this case, when the pressure in the case 11 is increased and the pressure release valve 20 is broken and opened, the portions of the valve body 21 corresponding to the regions S1 and S2 are scattered from the case 11. Accordingly, the linear groove separating portions 51 are provided such that the cross-sectional areas of the linear groove separating portions 51 is greater than or equal to 0.0137 times as large as the area of the regions S1 and S2. This prevents the portions corresponding to the regions S1 and S2 from scattering as described above.

The present embodiment may be modified as follows.

Figure 14A:
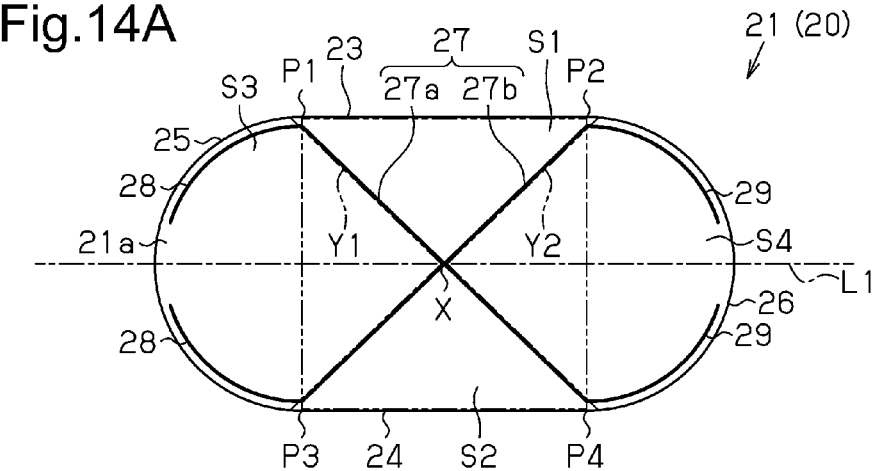
FIGS. 14A to 14C are plan views each illustrating the front surface of the valve body according to a modification.
Figure 14B:
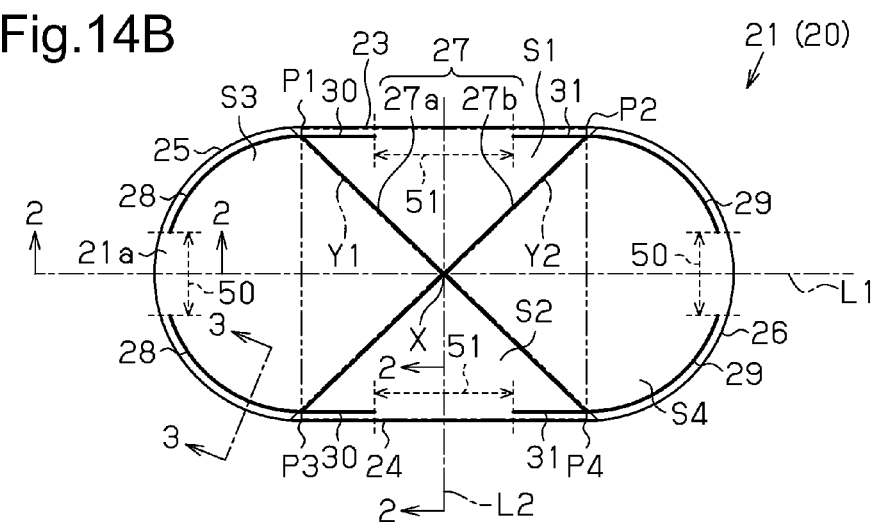
Figure 14C:
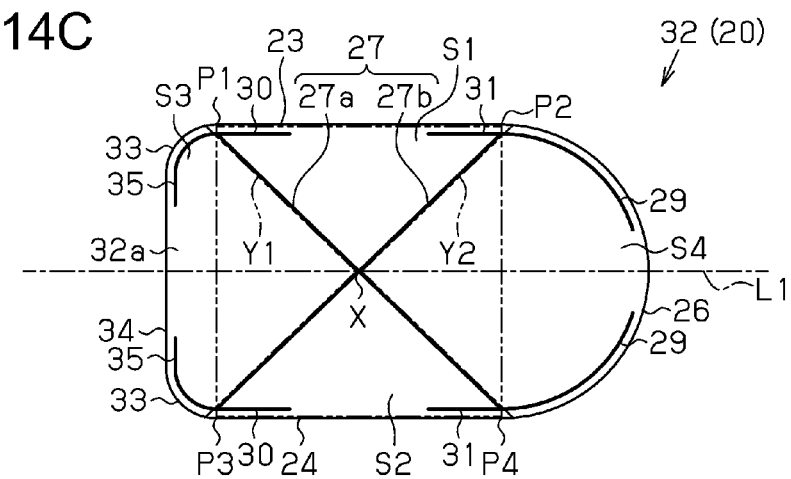

As shown in FIGS. 14A to 14C, the straight grooves 27a and 27b may be provided such that the imaginary straight lines Y1 and Y2 along the straight grooves 27a and 27b intersect the circumferential edges of the arcuate portions 25, 26, or 33. In this case, the ends of the straight grooves 27a and 27b are located in the vicinity of the arcuate portions 25, 26 or 33. In this case, the regions S1 to S4 are also provided such that the area of the regions with more portions that are in contact with the arcuate portions 25, 26, or 33 is greater than the area of the regions with less portions that are in contact with the arcuate portions 25, 26, or 33. This configuration also provides the same advantages as those of the first through third embodiments. These alternative embodiments are applicable to the fifth and sixth embodiments in the same manner.

In the above alternative embodiments, the positions at which the imaginary straight lines Y1 and Y2 intersect the arcuate portions 25, 26, or 33 may be set as positions that are further away from the boundaries P1 to P4 and closer to the arcuate portions 25, 26, or 33 so that the straight grooves 27a and 27b are provided along the imaginary straight lines Y1 and Y2. In this case, the imaginary straight lines Y1 and Y2 intersect the circumferential edges of the arcuate portions 25, 26, or 33 as the straight grooves 27a and 27b do. In this case, the regions S1 to S4 are provided such that the area of the regions with more portions that are in contact with the arcuate portions 25, 26, or 33 is greater than the area of the regions with less portions that are in contact with the arcuate portions 25, 26, or 33. In this case, the same advantages as those of the above embodiments are also obtained.

The straight grooves 27a and 27b need not be located on the imaginary straight line Y1, which connects the boundaries P1 and P4, and the imaginary straight line Y2, which connects the boundaries P2 and P3. The straight grooves 27a and 27b may be located at positions at which the ends of the imaginary straight lines Y1 and Y2 located on the same straight portion 23 or 24 in the vicinity of the boundaries approach each other. As shown in FIG. 8, for example, the imaginary straight lines Y1 and Y2 in the case where this alternative embodiment is applied are extended along the straight grooves 27a and 27b to intersect the straight portions 23 and 24.

As long as the shape of the pressure release valve 20 includes the arcuate portions, the shape may be changed to other shapes. The shape of the pressure release valve 20 may be oval or circular, for example. Further, the shape of the pressure release valve 20 may be a shape configured by connecting the first ends of the straight portions 23 and 24 by an arcuate portion and the second ends by a straight portion.

The intersecting grooves 27 may be of a Y shape in place of the X shape.

In the valve bodies 21, 32, 36, 37, and 39, grooves may be provided in the back surface. When the grooves such as the intersecting grooves 27, the arcuate grooves 28 and 29, and the linear grooves 30 and 31 are provided in the back surface of the valve body 39 in the sixth embodiment, the groove 40 is provided in the front surface 21a of the valve body 39.

The shape of the cross section of each groove may be changed.

The shape of the case 11 may be changed. For example, the case 11 may be cylindrical.

The pressure release valve 20 may be provided separately from and joined to the case 11. As for the joint, any joining methods such as welding (for example, laser welding) may be performed.

The electrode assembly 12 is not limited to the layered type. A winding type electrode assembly in which a band-like positive electrode and a band-like negative electrode are wound and layered may be employed.

The rechargeable battery 10 corresponds to a rechargeable lithium-ion battery. However, the rechargeable battery 10 is not limited to this. Other rechargeable batteries may be employed. That is, any rechargeable battery may be employed as long as ions move between the positive electrode active material layer and the negative electrode active material layer and the electric charge is transferred. Further, the above embodiments may be applied to a capacitor as the power storage device.

The rechargeable battery 10 may be mounted on an automobile as a vehicle power supply device, and may be mounted on an industrial vehicle. Further, the above embodiments may be applied to a stationary power storage device.

In the third embodiment, the grooves provided in the front surface 32a of the valve body 32 may be the intersecting grooves 27 and the arcuate grooves 29 and 35.

In the fourth embodiment, the shape of the valve body 36 may be an oval track shape configured by a straight portion that connects the intersecting points P5 and P7, a straight portion that connects the intersecting points P6 and P8, an arcuate portion that connects the intersecting points P5 and P8, and an arcuate portion that connects the intersecting points P6 and P7. In this case, the same advantages as those of the above embodiments are also obtained.

In the fifth embodiment, the number of the grooves that intersect the intersecting grooves 27 may be changed. For example, two straight grooves 38 may intersect the intersecting grooves 27. When a plurality of the straight grooves 38 is provided, it is preferable that at least one of the straight grooves 38 extend in the long side direction of the lid body 14. However, all the straight grooves 38 may extend in the direction perpendicular to the long side direction. In this case, the same advantages as those of the above embodiments are also obtained.

In the fifth embodiment, the length of the straight groove 38 may be changed. The straight groove 38 may be shorter than the straight groove 38 of the fifth embodiment. The straight groove 38 may extend to only one of the regions S3 and S4. For example, the straight groove 38 may extend to only the region S3.

Figure 13A:
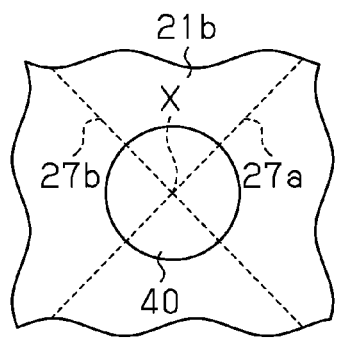
FIGS. 13A and 13B are plan views each illustrating a part of the back surface of a valve body according to a modification.
Figure 13B:
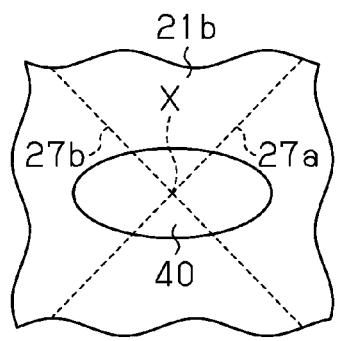

As shown in FIGS. 13A and 13B, the shape of the groove 40 in the sixth embodiment may be changed. FIG. 13A shows an example in which the groove 40 is formed circular, and FIG. 13B shows an example in which the groove 40 is formed oval. The shape of the groove 40 may be changed as long as the groove 40 is located at a position at which the groove 40 overlaps the intersecting point X of the intersecting grooves 27 and the thin film portion 41 is located between the bottom of the groove 40 and the bottoms of intersecting grooves 27. In this case, the same advantages as those of the above embodiments are also obtained.

The relationship between the angles α and β of the intersecting grooves 27 in the fourth embodiment may be applied to the intersecting grooves 27 in the valve body 21 of the first embodiment, which does not have the linear grooves 30 and 31 or the intersecting grooves 27 in the valve body 32 of the third embodiment. In the same manner, the relationship between the angles α and β of the intersecting grooves 27 may be applied to the fifth and sixth embodiments.

The straight groove 38 in the fifth embodiment may be applied to the intersecting grooves 27 in the valve body 21 of the first embodiment, which does not have the linear grooves 30 and 31 or the intersecting grooves 27 in the valve body 32 of the third embodiment. In the same manner, the straight groove 38 may be applied to the fifth and sixth embodiments.

The groove 40 in the sixth embodiment may be applied to the valve body 21 of the first embodiment, which does not have the linear grooves 30 and 31 or the valve body 32 of the third embodiment. In the same manner, the groove 40 may be applied to the fifth and sixth embodiments.

The entire portions of the linear grooves 30 and 31 need not be linear. Any linear grooves 30 and 31 may be employed as long as the linear grooves 30 and 31 are continuous with the intersecting grooves 27 and the arcuate grooves 28 and 29 and portions of the linear grooves 30 and 31 are along the corresponding straight portions 23 and 24 of the valve body.

The arcuate groove separating portions 50 and the linear groove separating portions 51 in the seventh embodiment may be applied to the other embodiments that disclose the valve body including the arcuate grooves 28 and 29 and the linear grooves 30 and 31 and the alternative embodiments shown in FIGS. 14A to 14C in the same manner. For example, one of the arcuate groove separating portions 50 may be provided between the arcuate grooves 28 along the arcuate portion 25 and the other one of the arcuate groove separating portions 50 may be provided between the arcuate grooves 29 along the arcuate portion 26 in the first embodiment. In the second, fourth, fifth, and sixth embodiments, the arcuate groove separating portions 50 and the linear groove separating portions 51 may be provided in the same manner as in the seventh embodiment. Further, one of the arcuate groove separating portions 50 may be provided between the arcuate grooves 29 along the arcuate portion 26, the other one of the arcuate groove separating portions 50 may be provided between the arcuate grooves 35 along the arcuate portions 33, and the linear groove separating portions 51 each may be provided between the corresponding pair of the linear grooves 30 and 31 in the third embodiment.

Figure 15A:
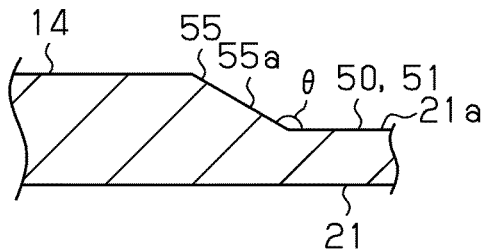
FIG. 15A is a cross-sectional view taken along line 2-2 of FIG. 14B.
Figure 15B:
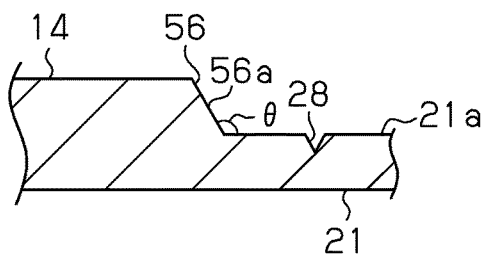
FIG. 15B is a cross-sectional view taken along line 3-3 of FIG. 14B.

The connecting portions between the lid body 14 and the valve body 21 shown by lines 2-2 and 3-3 in FIG. 14B may be tapered as shown in FIGS. 15A and 15B. The tapered portion 55 or 56 is located at the connecting portion between the lid body 14 and the valve body 21 and directly connected to the circumferential edge of the valve body 21. The tapered portion 55 or 56 is slanted such that an angle θ between the slanted surface 55a and the front surface 21a of the valve body 21 continuous with the slanted surface 55a or between the slanted surface 56a and the front surface 21a continuous with the slanted surface 56a is set to be obtuse. This connects the lid body 14 and the valve body 21 not in the right-angled manner but in the smooth manner. The tapered portion 55 or 56 located in the connecting portion between the lid body 14 and the valve body 21 increases the strength of the circumferential edge of the valve body 21.

As shown in FIG. 15A, the angle θ of the tapered portion 55 connected to the arcuate groove separating portions 50 and the linear groove separating portions 51 as separating portions is set to be greater than the angle θ of the tapered portion 56 connected to the other portions as shown in FIG. 15B. This further increases the strength of the circumferential edge of the valve body 21 at which the arcuate groove separating portions 50 and the linear groove separating portions 51 are located. The other portions shown in FIG. 15B are referred to as the portions in which the arcuate grooves 28 and 29 and the linear grooves 30 and 31 as grooves are located along the circumferential edge of the valve body 21. As described in the seventh embodiment, the arcuate groove separating portions 50 correspond to the portions between the adjacent pair of the ends of the arcuate grooves 28 and between the adjacent pair of the ends of the arcuate grooves 29. The ends of the arcuate grooves 28 and 29 are opposite to the intersecting grooves 27. As described in the seventh embodiment, the linear groove separating portions 51 correspond to the portions between the adjacent pairs of the ends of the linear grooves 30 and 31 that are opposite to the intersecting grooves 27. That is, the arcuate groove separating portions 50 and the linear groove separating portions 51 correspond to the portions in which neither the arcuate grooves 28 and 29 nor the linear grooves 30 and 31 are located.

When the pressure release valve 20 breaks and opens, the arcuate groove separating portions 50 and the linear groove separating portions 51 tend to maintain the state where fragments of the valve body 21 are connected to the lid body 14. The locating of the tapered portion 55 between the valve body 21 and the lid body 14 increases the strength therebetween to ensure that the fragments of the valve body 21 are prevented from being broken. That is, this prevents the fragments of the valve body 21 from scattering due to the breaking and opening of the pressure release valve 20.

Figure 16A:
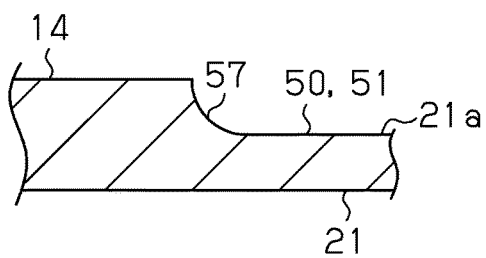
FIG. 16A is a cross-sectional view taken along line 2-2 according to a modification.
Figure 16B:
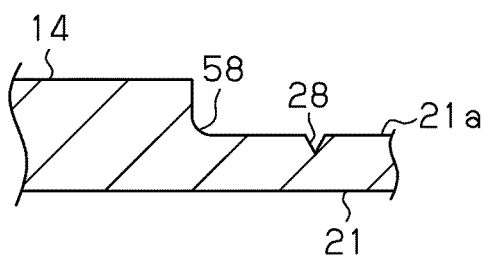
FIG. 16B is a cross-sectional view taken along line 3-3 according to a modification.

The connecting portions between the lid body 14 and the valve body 21 shown by lines 2-2 and 3-3 in FIG. 14B may be arcuate as shown in FIGS. 16A and 16B. In this case, a round portion 57 or 58 is located at the connecting portion between the lid body 14 and the valve body 21 and directly connected to the circumferential edge of the valve body 21 in place of the tapered portion 55 or 56 in the above described alternative embodiments. The round portion 57 and 58 are curved such that they are recessed toward the lid body 14. This connects the lid body 14 and the valve body 21 not in the right-angled manner but in the smooth manner. As shown in FIG. 16A, the radius of curvature of the round portion 57 connected to the arcuate groove separating portions 50 and the linear groove separating portions 51 as separating portions is set to be greater than the curvature radius of the round portion 58 connected to the other portions as shown in FIG. 16B. The locating of the round portion 57 or 58 at the connecting portion between the lid body 14 and the valve body 21 provides the same advantage as in the case where the tapered portion 55 or 56 is provided in the above described alternative embodiments.

The above tapered portions 55 and 56 and the round portions 57 and 58 may be applied to the configurations according to the first through seventh embodiments, or other configurations according to alternative embodiments.

The tapered portions 55 and 56 may have the same configuration. The round portions 57 and 58 may have the same configuration. The tapered portions 55 and 56 and the round portions 57 and 58 need not be located on the entire circumferential edge of the valve body 21. That is, they may be located at portions of the circumferential edge of the valve body 21. Specifically, they may be located at only the portions of the circumferential edge in which the arcuate groove separating portions 50 and the linear groove separating portions 51 are located.

The valve body 21 may be located on the bottom of a recess formed in the front surface of the lid body 14 is recessed. The valve body 21 may also be located on the bottom of a recess formed in the back surface of the lid body 14. Further, the valve body 21 may be located between the bottoms of recesses formed in the front surface and the back surface of the lid body 14. The above tapered portions 55 and 56 or the round portions 57 and 58 are located at corner portions of the recesses so that they are located at the connecting portions between the lid body 14 and the valve body 21. The front surface of the lid body 14 corresponds to a surface that is an outer surface of the case 11 when the case body 13 is joined to the lid body 14. The back surface of the lid body 14 corresponds to a surface that is an inner surface of the case 11 when the case body 13 is joined to the lid body 14.

DESCRIPTION OF THE REFERENCE NUMERALS

10 . . . rechargeable battery, 11 . . . case, 12 . . . electrode assembly, 14 . . . lid body, 20 . . . pressure release valve, 21, 32, 36, 37 and 39 . . . valve body, 21*a*, 32*a* . . . front surface, 21*b*, 32*b* . . . back surface, 23, 24 . . . straight portion, 25, 26, and 33 . . . arcuate portion, 27 . . . intersecting groove, 27*a*, 27*b* . . . straight groove, 28, 29, and 35 . . . arcuate groove, 38 . . . straight groove, 40 . . . groove, 50 . . . arcuate groove separating portion, 51 . . . linear groove separating portion, α, β . . . angle, S1 to S4 . . . region, P1 to P4 . . . boundary, Y1 to Y4 . . . imaginary straight line, and X . . . intersecting point.

The invention claimed is:

1. A power storage device comprising:
a case, which accommodates an electrode assembly; and
a pressure release valve provided in the case, wherein the pressure release valve releases pressure in the case to an outside of the case, wherein
the pressure release valve includes
arcuate portions, which configure portions of a circumferential edge of the pressure release valve,
intersecting grooves, and
a plurality of arcuate grooves connected to ends of the intersecting grooves, wherein the arcuate grooves extend along the arcuate portions,
wherein imaginary straight lines extend along the intersecting grooves, respectively, and intersect the circumferential edge of the pressure release valve,
a first region is defined by the imaginary straight lines and a part of the circumferential edge of the pressure release valve,
a second region is defined by the imaginary straight lines and another part of the circumferential edge of the pressure release valve,
the first and second regions are configured such that the first region contacts a larger part of the arcuate portions than the second region, and
the area of the first region is greater than the area of the second region.

2. The power storage device according to claim 1, wherein the intersecting grooves include two straight grooves.

3. The power storage device according to claim 1, wherein the circumferential edge of the pressure release valve has an oval track-like shape in which parallel straight portions are connected by the arcuate portions.

4. The power storage device according to claim 1, wherein an angle of the first region formed by the imaginary lines is greater than an angle of the second region formed by the imaginary lines.

5. The power storage device according to claim 1, wherein at least one groove further intersects the intersecting grooves through an intersecting point of the intersecting grooves.

6. The power storage device according to claim 5, wherein the case includes a case wall that is rectangular with long sides and short sides, and
the at least one groove, which intersects the intersecting grooves, extends along the long sides of the case wall.

7. The power storage device according to claim 1, wherein the pressure release valve includes a groove at a position on a rear side of a region including an intersecting point of the intersecting grooves, and
the groove on the rear side overlaps the region in a thickness direction of the pressure release valve.

8. The power storage device according to claim 1, wherein the pressure release valve includes an arcuate groove separating portion at a portion between separate ends of an adjacent pair of the arcuate grooves, the separate ends being located opposite to the intersecting grooves, and
a cross sectional area of each arcuate groove separating portion is greater than or equal to 0.0137 times as large as the area of the first region.

9. The power storage device according to claim 1, wherein the pressure release valve includes
a plurality of continuous grooves extending along a circumferential edge of the second region, wherein the continuous grooves are continuous with the arcuate grooves and the intersecting grooves, and
a continuous groove separating portion at a portion between separate ends of an adjacent pair of the continuous grooves, the separate ends being located opposite to the intersecting grooves, and
a cross-sectional area of the continuous groove separating portion is greater than or equal to 0.0137 times as large as the area of the second region.

10. The power storage device according to claim 1, wherein
the pressure release valve includes
a valve body that is thinner than a board thickness of the case,
a plurality of grooves that are continuous with the intersecting grooves, and
a separating portion at a portion between separate ends of an adjacent pair of the grooves, the separate ends being located opposite to the intersecting grooves, and
a tapered portion or round portion is provided at at least a portion connected to the separating portions of connecting portions between the case and the lid body, and
the tapered portion or the round portion is connected to the valve body.

11. The power storage device according to claim 1, wherein the power storage device is a rechargeable battery.

12. The power storage device according to claim 1, wherein the pressure release valve includes the intersecting grooves and the arcuate grooves in a front surface of the pressure release valve.

13. The power storage device according to claim 1, wherein
the case includes a case wall,
the case wall includes a front surface located on an outside of the case and a back surface located in the case, and
the back surface of the case wall includes a groove that overlaps an intersecting point of the intersecting grooves in a thickness direction of the case wall.

\* \* \* \* \*